United States Patent [19]
Becker et al.

[11] 3,942,569
[45] Mar. 9, 1976

[54] UNILATERALLY CLOSED HOLLOW STICK OF SHIRRED SAUSAGE CASING WITH AN INNER CLOSURE FORMED FROM THE TUBULAR CASING ITSELF

[75] Inventors: Reinhold Becker, Wiesbaden-Biebrich; Manfred Hennecken, Walluf; Hans-Georg Zimmermann, Wiesbaden-Biebrich, all of Germany

[73] Assignee: Hoechst Aktiengesellschaft, Frankfurt am Main, Germany

[22] Filed: Dec. 2, 1974

[21] Appl. No.: 528,838

[30] Foreign Application Priority Data
Dec. 5, 1973  Germany............................ 2360480

[52] U.S. Cl. .......................... 150/1; 17/49; 229/53; 426/138
[51] Int. Cl.² ................. B65D 29/00; A22C 13/02

[58] Field of Search ....... 150/3, 1; 229/53; 426/138, 426/140; 206/802; 17/49

[56] References Cited
UNITED STATES PATENTS

| | | | |
|---|---|---|---|
| 3,274,005 | 9/1966 | Alsys | 426/140 |
| 3,383,222 | 5/1968 | Alsys et al. | 150/1 |
| 3,865,954 | 2/1975 | Tums et al. | 426/140 |
| 3,892,869 | 7/1975 | Sheridan et al. | 426/138 |

*Primary Examiner*—Leonard Summer
*Attorney, Agent, or Firm*—James E. Bryan

[57] ABSTRACT

This invention relates to a unilaterally closed cylindrical hollow stick of shirred tubular casing having a closure within the stick bore in the zone of the stick beginning and formed from the casing end itself, said closure being composed of a U-shaped body of longitudinally shirred tubular casing. The invention also relates to a process for the production of the closure.

2 Claims, 6 Drawing Figures

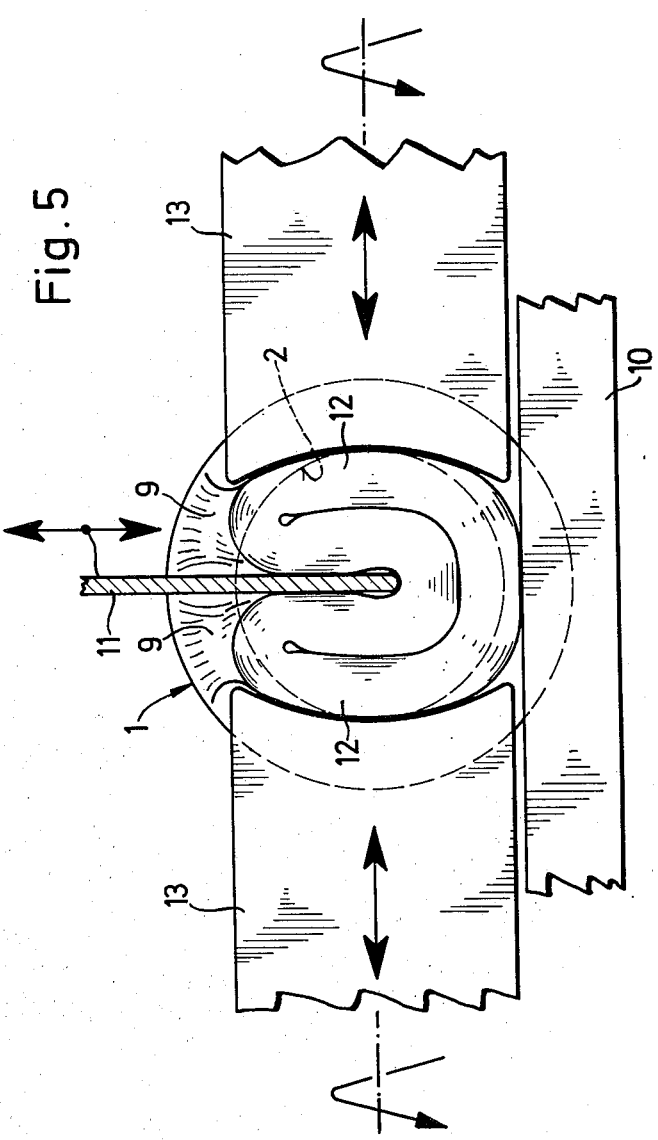

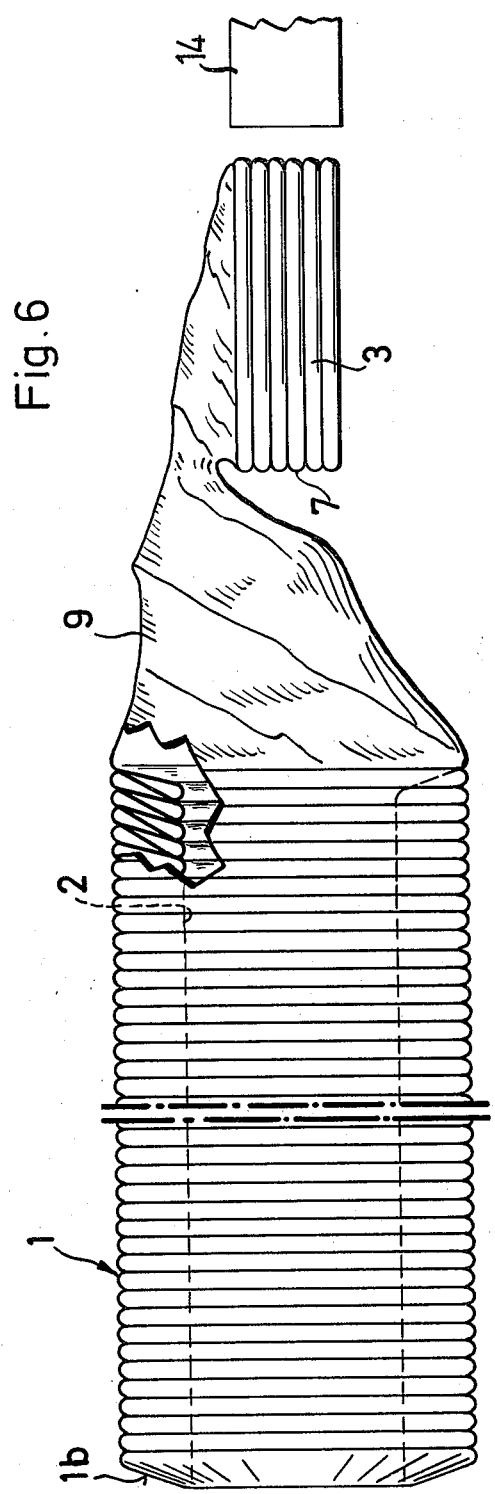

UNILATERALLY CLOSED HOLLOW STICK OF SHIRRED SAUSAGE CASING WITH AN INNER CLOSURE FORMED FROM THE TUBULAR CASING ITSELF

This invention relates to a unilaterally closed cylindrical hollow stick of shirred sausage casing with an end closure arranged within the stick bore and formed from the casing end itself, and to a process for the production thereof.

For the production of sausages, tubular sausage casings of synthetic material, particularly of cellulose hydrate, are used on a large scale. In the production of sausages, such tubular casings are used as shirred hollow sticks. There is used, for example, a tubular casing of a length of about 30 m which is shirred and compressed in the longitudinal direction according to known processes to form a pleated cylindrical hollow stick of a length of about 30 cm.

In using the stick, the stuffing pipe of a sausage filling machine is pushed into the cylindrical bore thereof and the sausage meat is then continuously pressed from the stuffing pipe into the stick. For this purpose, the stick must be closed at the end adjacent to the opening of the stuffing pipe.

By the amount of pressure applied to the sausage meat, the stick is continously unshirred according to the quantity of sausage meat pressed into it. The sausage strand obtained thereby is divided into a plurality of individual sausages by tying or twisting in synchronism with the filling procedure.

The first obtained sausage of the formed sausage chain is not used since it usually does not contain the desired quantity of stuffing. The quantity contained in this sausage is recovered for reasons of economics. The end closure of the stick, therefore, must be so formed that it easily can be smoothed out by hand since the recovery of the sausage meat contained in the first sausage takes place during the production of the sausage chain. On the other hand, the end closure of the stick must be sufficiently firm so that it is not opened unintentionally by the pressure of the sausage meat acting upon it when the meat is pressed into the stick.

A unilaterally closed stick with an end closure within the stick bore is known in which the end closure consists of the tubular casing forming the stick.

The known end closure is produced by pressing the end portion of a stick on one side and in a radial direction into the stick bore and simultaneously partially inverting it into the interior of the stick. The known stick has the disadvantage that when it is used the end closure is not sufficiently tight, particularly in the case of sticks of relatively large tube bore diameters as well as when sausage meat of a relatively high flowability is used.

Another disadvantage of the known end closure is that a not inconsiderable quantity of tube material is required for forming it.

The object of the present invention is to provide a unilaterally closed cylindrical hollow stick of shirred tubular casing with an end closure within its bore, which closure is composed of the tubular casing forming the stick and is an integral part of the stick. The closure, on the one hand sufficiently tightly seals the stick when the sausage meat is pressed into it and is sufficiently firmly arranged in the stick bore and, on the other hand, can be easily smoothed out by hand after the sausage meat has been pressed into the closed end portion of the tubular casing forming the stick.

The present invention provides a unilaterally closed cylindrical hollow stick of shirred tubular casing with a closure within the stick bore in the zone of the stick beginning and formed from the casing end itself, the closure being composed of a U-shaped body of longitudinally shirred tubular casing.

Preferably, the closure is so arranged in the stick bore that its dome-shaped end points in the direction of the stick end.

The hollow space of the stick is cylindrical; it is also called the stick bore.

The tubular casing from which the stick and its end closure are formed may be a cellulose derivative, particularly cellulose hydrate, or also a synthetic polymer, e.g., a polyamide.

The dome-shaped end of the U-shaped closure is the outer side of a curved part between the two legs of the closure. The stick beginning is that part of the stick which is first formed during the shirring of the tubular casing. Consequently, that part of the stick which is formed last during shirring is called the stick end.

The expression U-shaped body of longitudinally shirred tubular casing means a body having a form which results when a narrow stick ring is so separated from the stick that, between it and the stick, there is an unshirred tube portion as an element integrally connecting both parts, the narrow stick ring is compressed by a radially acting force in such a manner that the flattened ring has a linear slit, and the flattened narrow stick ring is then folded in so that the ends of the flattened stick ring are moved toward each other. Folding takes place in such a manner that the flattened narrow stick ring is bent about a bending line which corresponds to the course of the longitudinal axis of the narrow stick ring. Folding takes place in a plane to which the longitudinal axis of the stick ring is perpendicular.

The longitudinal axis of the stick ring is the longitudinal axis of the stick ring bore.

The stick ring bore is the central hollow space enclosed by the ring. A stick ring is narrow when its hollow space is short compared to that of the stick.

A U-shaped body of longitudinally shirred tubular casing also means a body the legs of which are not parallel to one another but form an acute angle with one another.

In a preferred embodiment of the closure, the legs are of equal length.

Preferably, the closure is so arranged in the stick bore that its leg ends are within the stick bore.

The legs of the closure are under a slight material-induced tension which forces them apart whereby the closure is fixed in the stick bore against unintentional sliding out.

The invention further relates to a process for the production of a unilaterally closed hollow stick of shirred tubular casing with a closure arranged in the interior of the stick and formed of the tubular casing itself, according to which a part of the stick is unshirred to form an unshirred tube portion and a closure is formed therefrom in the interior of the stick. A narrow stick ring is so drawn from the stick that an unshirred portion of tubular casing remains between the ring and the stick, and a radially acting pressing force is caused to act upon the outer surface of the narrow stick ring along a line parallel to the longitudinal axis of its bore, which force compresses the ring against a planar support perpendicularly to the surface thereof. The two halves of this shaped body are bent toward each other about a bending axis parallel to the surface of the support and to the longitudinal axis of the stick ring, the closure is rotated through 90° in such a manner that its dome-shaped end points to the stick end, and it is then pushed into the stick bore.

The narrow stick ring is drawn from the stick by means of a gripping device, e.g., by means of tongs.

Radial compression of the ring may be performed by a die element, the effective surface of which has the form of a very narrow rectangle.

The two halves of the shaped body formed by the first pressing procedure are bent toward each other by means of die elements which act upon them laterally.

The U-shaped folded body is rotated through 90° in such a manner that the longitudinal axes of its legs extend in the direction of the longitudinal axis of the stick and is then pushed into the hollow space of the stick. In a preferred embodiment of the process, after the rotation through 90°C, the closure is so pushed into the stick bore that the dome-shaped end of the U-shaped body points to the stick end.

Pushing of the closure into the hollow space of the stick may be performed by means of a die device, for example, or by means of a device in the form of tongs.

The drawing further illustrates the form of the end closure as well as the performance of the process for the production thereof, in which.

Figure 1:
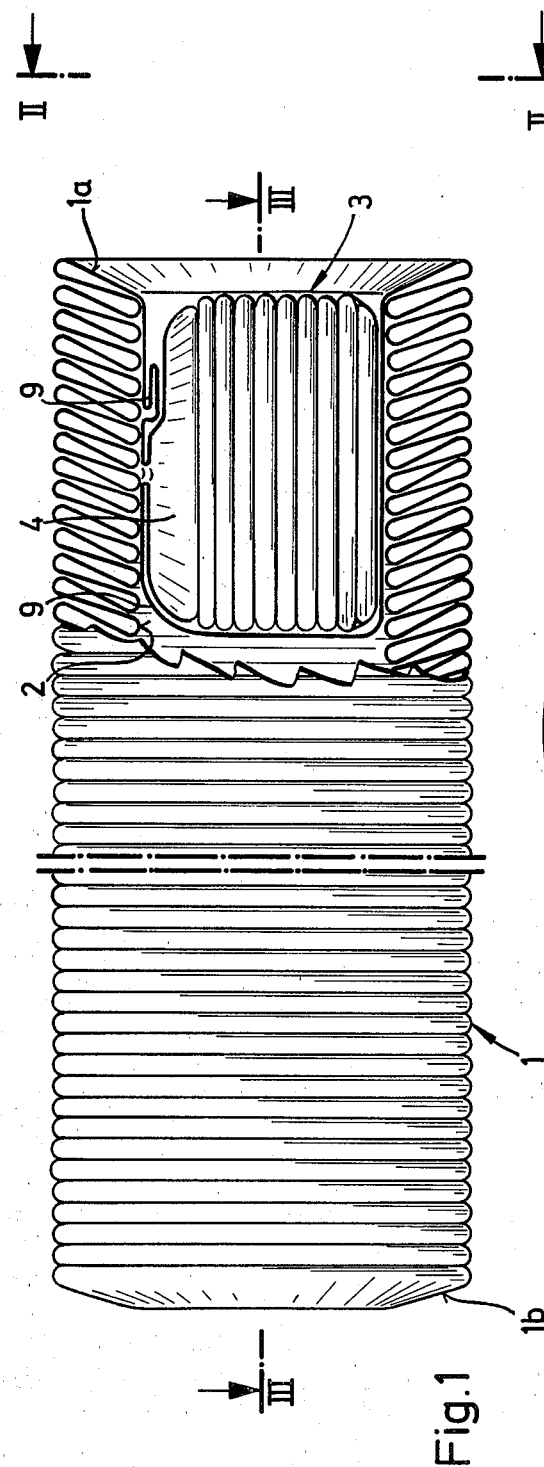
FIG. 1 shows a stick with a closure within the stick bore.

In FIG. 1, numeral 1 denotes the stick of shirred tubular casing, numeral 1a the stick beginning and numeral 1b the stick end, numeral 2 denotes the cylindrical bore of the stick, numeral 3 the end closure within the bore 2, and numeral 4 an unshirred portion of the tubular casing integrally connecting the stick 1 with the end closure 3.

Figure 2:
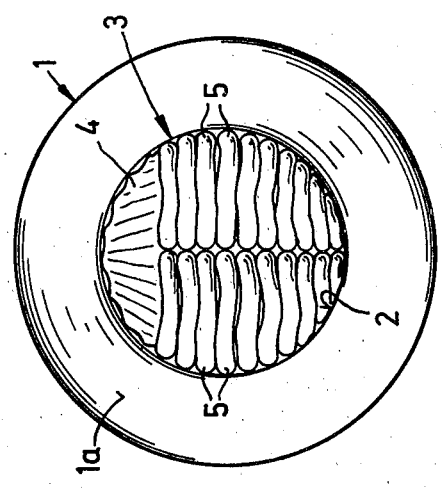
FIG. 2 is a front elevation of the stick according to FIG. 1 viewed towards II—II.

In FIG. 2, numerals 1, 1a, 2, 3 and 4 have the same meanings as in FIG. 1. Numeral 5 denotes the ends of the legs of the U-shaped end closure in the stick bore.

Figure 3:
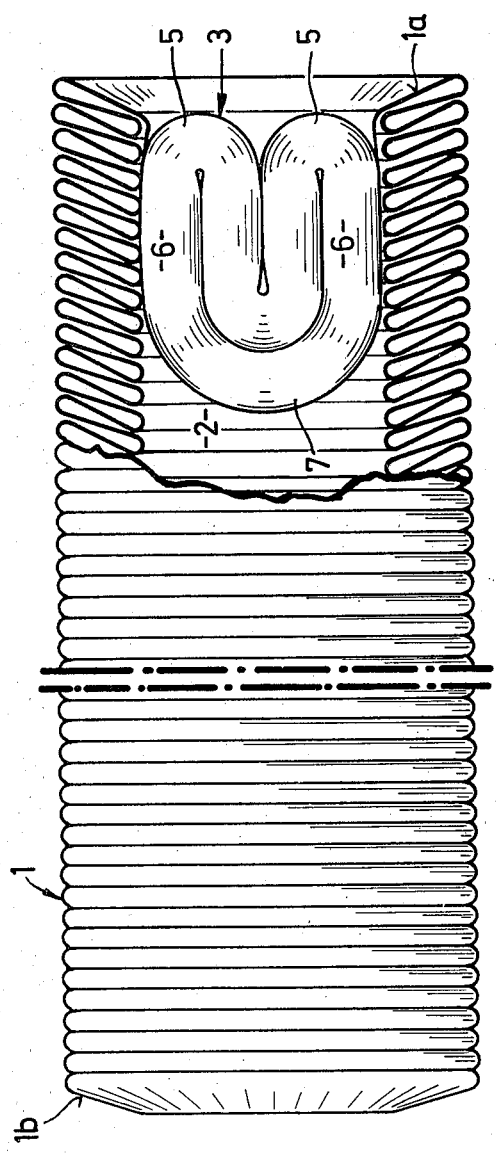
FIG. 3 is a plan view of a stick cut along the line III—III of FIG. 1, and FIGS. 4, 5 and 6 show phases of the production of the end closure.

In FIG. 3, numerals 1, 1a, 2, 3 and 5 have the same meanings as in FIG. 1. Numeral 6 denotes a leg of the U-shaped end closure and numeral 7 its dome-shaped end.

Figure 4:
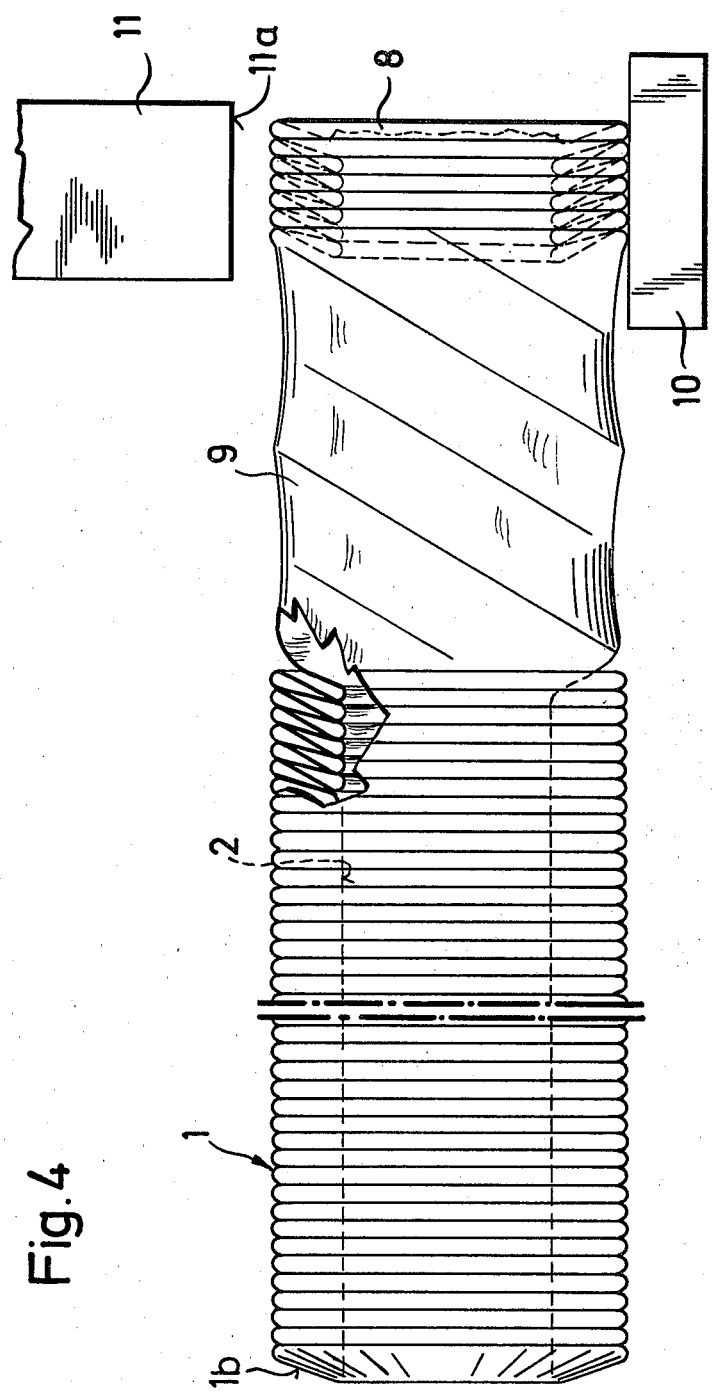

In FIG. 4, numerals 1, 1b, and 2 have the same meanings as in FIG. 1. Numeral 8 denotes a narrow stick ring and numeral 9 an unshirred portion of the tubular casing which integrally connects the stick ring 8 with the stick 1. This tube portion generally has a length of about 2 cm.

The number of the shirred pleats of the tubular casing forming the narrow stick ring depends indirectly on the size of the bore diameter of the tube employed and directly on the diameter of the stick bore, the bore diameter of the tube and the diameter of the stick bore being in a certain relation to one another which is predetermined by the dimensions of the stuffing pipe of the sausage filling machine used. A narrow stick ring formed from a tube of a bore diameter between 14 and 22 mm generally has 6 to 12 shirred pleats.

The length of the unshirred tubular casing between the stick ring 8 and the stick 1 allows the closure, after its formation and rotation through 90°, to be pushed into the stick bore.

After the stick ring has been drawn-off it is bent in another process step in which it is compressed between the support 10 and the folding die 11. Compressing is performed by moving the folding die 11 and the support 10 toward one another. The folding die 11 has a die surface 11 which has the form of a narrow rectangle. The longer edge of the die surface is parallel to the longitudinal axis of the stick bore or of the stick ring bore.

FIG. 5 shows the radially compressed stick ring. Numerals 1, 2, 9, 10 and 11 have the same meanings as in the previous figures. Numeral 12 denotes one half of the shaped body formed by compressing and numeral 13 denotes jaws which move the two halves 12 toward each other.

The jaws 13 are horizontally displaceable and rotatable. Simultaneously with the moving of the two jaws toward each other, which effects folding of the shaped body to a U-shaped body, the vertically movable folding die 11 is drawn upward. Then, the jaws 13 are rotated through 90° together with the U-shaped folded closure in such a manner that its dome-shaped end points to the end of the stick.

FIG. 6 shows this U-shaped folded closure shortly before it is pushed into the stick bore. Numerals 1 to 9 have the same meanings as in the previous figures. The closure 3 is pushed into the stick bore 2 by means of the slide-in die 14.

In a particularly preferred modification of the process, the stick ring is drawn from the stick to such an extent, e.g., about 3 to 6 cm, that the unshirred portion of the tube between the ring and the stick forms a loop. After the closure has been rotated and pushed into the stick bore, the lower part of the loop places itself in front of the stick ring so that, when the same is further pushed thereinto, additional tube material is drawn from the shirred stick and the tube loop is placed in the stick bore. The closure is pushed so deeply into the stick bore that the loop no longer projects from the stick opening.

It will be obvious to those skilled in the art that many modifications may be made within the scope of the present invention without departing from the spirit thereof, and the invention includes all such modifications.

What is claimed is:

1. A unilaterally closed cylindrical hollow stick of shirred tubular casing having a closure within the stick bore in the zone of the stick beginning and formed from the casing end itself, said closure being composed of a U-shaped body of longitudinally shirred tubular casing.

2. A stick according to claim 1 in which the closure has a dome-shaped end pointing in the direction of the stick end.

* * * * *